(12) United States Patent
Smith et al.

(10) Patent No.: US 8,592,746 B2
(45) Date of Patent: Nov. 26, 2013

(54) SYSTEMS AND METHODS FOR DRIVING AN OPTICAL MODULATOR

(75) Inventors: Douglas E. Smith, Phoenix, AZ (US); Steven G. Armstrong, Phoenix, AZ (US); Derek Mead, Scottsdale, AZ (US)

(73) Assignee: Honeywell International Inc., Morristown, NJ (US)

( * ) Notice: Subject to any disclaimer, the term of this patent is extended or adjusted under 35 U.S.C. 154(b) by 559 days.

(21) Appl. No.: 12/962,311

(22) Filed: Dec. 7, 2010

(65) Prior Publication Data

US 2012/0141062 A1 Jun. 7, 2012

(51) Int. Cl.
*G01J 1/04* (2006.01)
*G01J 1/42* (2006.01)
*G01J 5/08* (2006.01)

(52) U.S. Cl.
USPC .............. 250/227.11; 250/214 C; 327/52; 327/89

(58) Field of Classification Search
USPC ...... 250/214.1, 214 DC, 214 A, 208.2, 208.1, 250/214 C, 227.11; 327/52, 89, 96, 127, 327/246, 274, 280, 287, 359; 359/238
See application file for complete search history.

(56) References Cited

U.S. PATENT DOCUMENTS

| | | |
|---|---|---|
| 3,887,886 A | 6/1975 | Okada et al. |
| 4,344,188 A | 8/1982 | Tanabe et al. |
| 5,140,152 A * | 8/1992 | Van Zeghbroeck ....... 250/214 A |
| 5,767,968 A | 6/1998 | Strandjord |
| 6,265,941 B1 | 7/2001 | Lopata |
| 6,452,458 B1 * | 9/2002 | Tanimoto ........................ 331/57 |

FOREIGN PATENT DOCUMENTS

WO 0137413 5/2001

OTHER PUBLICATIONS

European Patent Office, "European Search Report", mailed Apr. 24, 2012, Published in: EP.
European Patent Office, "Office Action", May 22, 2012, Published in: EP.

* cited by examiner

*Primary Examiner* — Francis M Legasse, Jr.
(74) *Attorney, Agent, or Firm* — Fogg & Powers LLC

(57) ABSTRACT

Systems and methods for driving an optical modulator are provided. In one embodiment, a modulation drive circuit comprises: a balanced impedance network having a first and a second output generated from a first input, and a third and a fourth output generated from a second input, wherein the first and second outputs are balanced with one another, and the third and fourth outputs are balanced with one another; a first differential amplifier, wherein an inverting input of the first differential amplifier couples to the first output of the distribution network and a non-inverting input of the first differential amplifier couples to the third output of the distribution network; and a second differential amplifier, wherein an inverting input of the second differential amplifier couples to the fourth output of the distribution network and a non-inverting input of the second differential amplifier couples to the second output of the distribution network.

20 Claims, 3 Drawing Sheets

SYSTEMS AND METHODS FOR DRIVING AN OPTICAL MODULATOR

BACKGROUND

In a fiber optic gyroscope (FOG), counter-propagating light waves travel in opposite directions through a fiber optic coil. Rotation of the coil produces a phase difference in the light waves due to the Sagnac effect. FOGs are frequently used in high radiation environments where radiation-hardened electronics are utilized in order to avoid damage and erroneous operation. However, radiation-hardened electronics typically have inferior operating specifications when compared to non-radiation-hardened electronics. For example, radiation hardened amplifiers have slower rise times than non-radiation hardened amplifiers, which impacts the ability of a FOG to accurately modulate light waves utilized for measuring the rotation of the FOG. As a result, FOGs available in the art today using radiation hardened components typically provide inferior performance as compared to their non-radiation hardened counterparts.

For the reasons stated above and for other reasons stated below which will become apparent to those skilled in the art upon reading and understanding the specification, there is a need in the art for improved systems and methods for driving an optical modulator.

SUMMARY

Embodiments of the present invention provide systems and methods for driving an optical modulator and will be understood by reading and studying the following specification.

In one embodiment, a modulation drive circuit comprises: a balanced impedance network having a first output and a second output generated from a first input, and a third output and a fourth output generated from a second input, wherein the first output and the second output are balanced with respect to each other, and the third output and the fourth output are balanced with respect to each other; a first differential amplifier, wherein an inverting input of the first differential amplifier is coupled to the first output of the distribution network and a non-inverting input of the first differential amplifier is coupled to the third output of the distribution network; and a second differential amplifier, wherein an inverting input of the second differential amplifier is coupled to the fourth output of the distribution network and a non-inverting input of the second differential amplifier is coupled to the second output of the distribution network.

DRAWINGS

Embodiments of the present disclosure can be more easily understood and further advantages and uses thereof more readily apparent, when considered in view of the description of the preferred embodiments and the following figures in which.

In accordance with common practice, the various described features are not drawn to scale but are drawn to emphasize features relevant to the present disclosure. Reference characters denote like elements throughout figures and text.

DETAILED DESCRIPTION

In the following detailed description, reference is made to the accompanying drawings that form a part hereof, and in which is shown by way of specific illustrative embodiments in which the present disclosure may be practiced. These embodiments are described in sufficient detail to enable those skilled in the art to practice the present disclosure, and it is to be understood that other embodiments may be utilized and that logical, mechanical, electrical, and method changes may be made without departing from the scope of the present disclosure. The following detailed description is, therefore, not to be taken in a limiting sense. Further, the various sections of this specification are not intended to be read in isolation but considered together with the teachings of the written description as a whole.

Embodiments of the present invention provide for modulation drive circuitry designs that better utilize the capabilities of radiation hardened components. These embodiments for modulation drive circuitry include designs to decrease harmonic distortion of modulated optical waveforms, increase rise time performance, and decrease common mode integrated optical chip pickup by servoing mean IOC output against a loop closure ground reference. These benefits are accomplished by driving each of the amplifiers that, in turn, drive the optical modulation within the FOG, with a balanced differential input comprising two separately generated voltages, each a function of the optical signal received at the FOG's optical detector.

Figure 1:
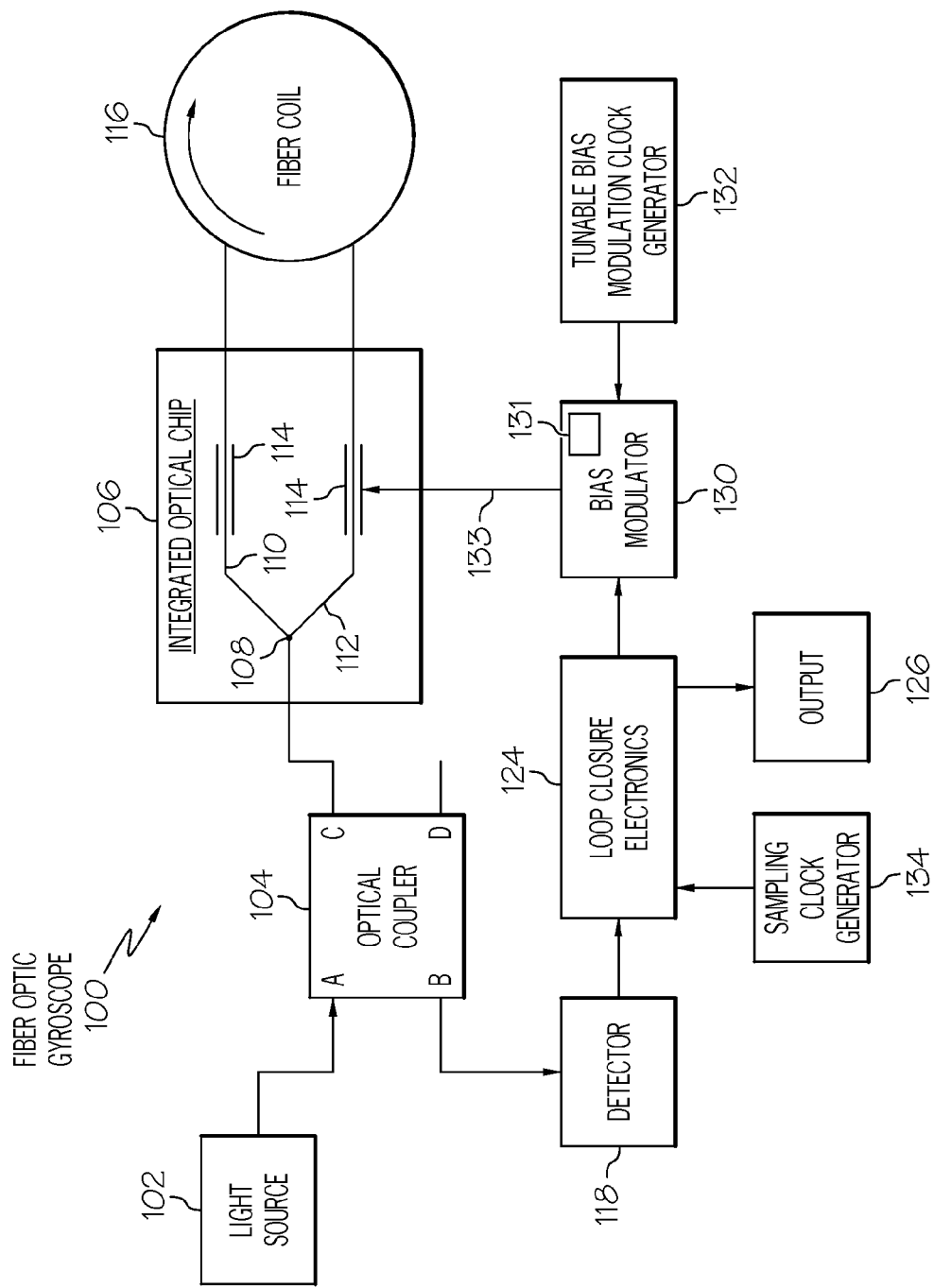
FIG. 1 is a diagram illustrating an exemplary embodiment of a fiber optic gyroscope.

FIG. 1 illustrates one exemplary embodiment of a fiber optic gyroscope (FOG) 100, such as an interferometric FOG. FOG 100 generally includes a light source 102, an optical coupler 104, an integrated optical chip 106, a fiber optic coil 116, a detector 118, a loop closure electronics module 124, and a bias modulator 130. Optionally, in other embodiments FOG 100 also includes a sampling clock generator 134, a tunable bias modulation clock generator 132, and an output 126. Each of these components is discussed in further detail as follows.

Light source 102 comprises a broadband light source for propagating electromagnetic waves through FOG 100. For example, in one embodiment, light source 102 is implemented using a pump laser. In FIG. 1, light source 102 is in optical communication with optical coupler 104 by using a suitable optical path, such as an optical fiber, for example.

Optical coupler 104 includes light transmission media that extend between ports A, B, C and D. Port A is connected to light source 102, port B is connected to detector 118, and port C is coupled to integrated optical chip 106. In the embodiment shown in FIG. 1, port D is unused. In general, when optical coupler 104 receives optical waves at any of its ports, optical coupler 104 propagates the waves such that approximately half of the transmitted light appears at each of the two ports on the opposite end of the incoming port. At the same time, substantially no optical waves are propagated to the port which is at the same end as the incoming port. For example, optical coupler 104 will transmit light received at port A to ports C and D, but not transmit the light to port B. Similarly, optical coupler 104 will transmit light received at port C to ports A and B, but not to port D. In other embodiments, other optical couplers are utilized having different ports than shown for optical coupler 104 in FIG. 1. Further, in still other embodiments, other optical devices, such as an optical circulator, are used rather than a coupler to distribute light signals between ports A, B and C such as described above such that a light signal received at port A is provided to port B and not C, and a light signal received at port C is provided to port B.

Integrated optical chip 106 (which is also referred to as an optical modulator) includes a Y-junction 108 and a pair of waveguides 110, 112. Additionally, integrated optical chip 106 includes a plurality of optical phase modulator electrodes 114 integrated with waveguides 110, 112. When light is propagated to integrated optical chip 106, the light is further split at Y-junction 108 and fed to waveguides 110, 112. The light in wave guide 110 is propagated to fiber optic coil 116, where it propagates clockwise around the length of fiber optic coil 116, and returns to wave guide 112. Likewise, the light in wave guide 112 is propagated to fiber optic coil 116, where it propagates counterclockwise around the length of fiber optic coil 116, and returns to wave guide 110 in integrated optical chip 106. After the light propagates both clockwise and counterclockwise around fiber optic coil 116, optical phase modulator electrodes 114 in integrated optical chip 106 electrically impress an optical phase modulation on the light waves that shifts operation of the interferometer from a bright interference fringe to a point between the bright fringe and the dark fringe. The adjustment of the interferometer provides better sensitivity and allows the FOG 100 to discern the sign of rotation. Further, the integrated optical chip 106 polarizes the light waves to ensure that only light waves with a desired polarity propagate through fiber optic coil 116.

Fiber optic coil 116 is typically wound around a core and about an axis around which rotation is sensed. Fiber optic coil 116 provides a closed optical path in which the light propagates in opposite directions, ultimately impinging on detector 118. Rotation about fiber optic coil 116's sensing axis in one direction causes an effective increase in the optical path length for one direction around fiber optic coil 116's sensing axis, and a decrease in the optical path length in the other direction around fiber optic coil 116's sensing axis. The optical path length difference introduces a phase shift between the light waves, a result known as the Sagnac effect, which occurs as a result of Fresnel's drag in glass or air.

After being propagated from fiber optic coil 116 and passing through their respective wave guides, the light waves are combined at Y-junction 108 and propagated to optical coupler 104. The combined light waves are output to detector 118. Detector 118 generates an electrical current in response to the light waves it receives and outputs an electrical signal that is proportional to the intensity of the combined light waves impinging on detector 118.

Detector 118 transmits the electrical signal to loop closure electronics module 124. In general, loop closure electronics module 124 receives the electrical signal from detector 118 and controls bias modulator 130 to drive integrated optical chip 106 to produce a feedback phase shift needed to keep a difference in intensity for two measurements of the interferometer at zero. Bias modulator 130 creates voltage signals that introduce phase bias modulation by applying a phase shift to the incoming and outgoing optical waves as they traverse through integrated optical chip 106.

In the embodiment shown in FIG. 1, bias modulator 130 outputs a square wave electrical signal that drives a modulating voltage across electrodes 114 in integrated optical chip 106. The application of voltage to integrated optical chip 106 creates an electrical field that changes the index of refraction of waveguides 108 and 112 between electrodes 114 according to the electro-optic effect. The change in the index of refraction introduces an optical phase shift proportional to the applied voltage across electrodes 114. In one implementation of the embodiment shown in FIG. 1, bias modulator 130 outputs a square wave with a frequency between 10 and 400 KHz for modulating the phase of the optical signal. In other embodiments, bias modulator 130 outputs other frequencies and waveform shapes. The bias modulation applied by electrodes 114 causes the detection points in the interferometer to shift, such that detector 118 measures optical intensity at two offset points of the optical waveform.

As described above, detector 118 receives the waves from optical coupler 104 and provides an output current proportional to the intensity of the two combined waves. The output of detector 118 is passed to loop closure electronics 124. Loop closure electronics 124 samples the output of detector 118. The sampling of the output of detector 118 is controlled by a sampling clock signal, which in one embodiment is created by a sampling clock generator 134.

As illustrated in FIG. 1, bias modulator 130 further comprises a modulation drive circuit 131 that amplifies a feedback phase bias signal 133. That is, modulation drive circuit 131 amplifies the signals that pass through the loop closure electronics 124 so that feedback phase bias signal 133 creates a sufficient electric field across electrode 114 to alter the phase difference between the counter-propagating optical waves in fiber optic coil 116. As described in greater detail below with respect to FIG. 2, modulation drive circuit 131 produces feedback phase bias signal 133 by utilizing information produced by loop closure electronics 124 to drive differential amplifiers using a balanced differential input. As described herein, modulation drive circuit 131, even when implemented using radiation hardened components, will exhibit rise times that are quick enough to sufficiently drive the electric fields across integrated optical chip 106 without negatively affecting performance.

Figure 2:
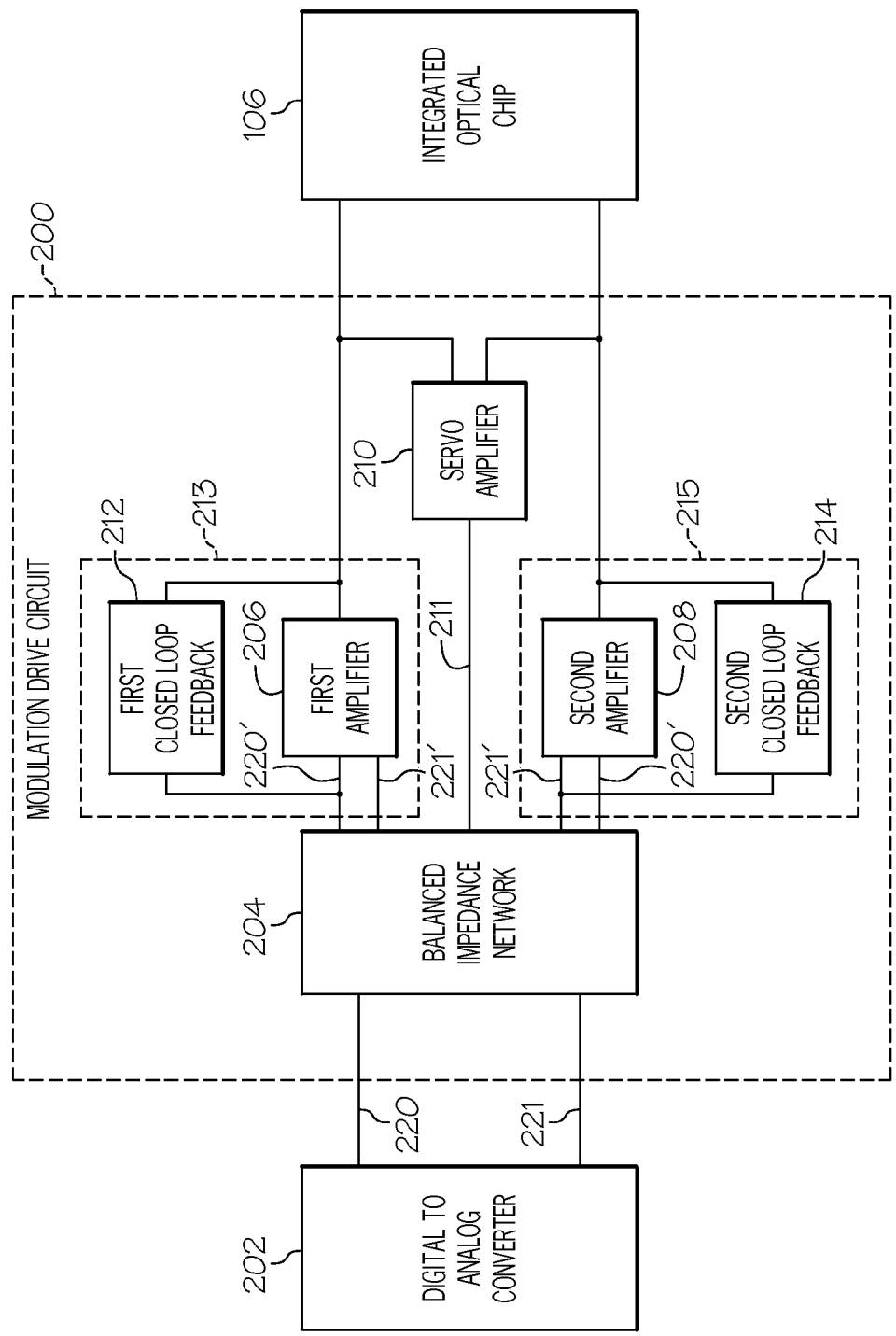
FIG. 2 is a box diagram illustrating an exemplary embodiment of a modulation driving circuit for a fiber optic gyroscope.

FIG. 2 illustrates a modulation drive circuit 200 of one embodiment of the present invention for driving an optical modulator such as integrated optical chip 106. For the embodiment shown in FIG. 1, modulation drive circuit 200 is implemented as modulation drive circuit 131 within bias modulator 130. However, in other embodiments, modulation drive circuit 200 is constructed as part of loop closure electronics 124. For the embodiment of FIG. 2, loop closure electronics 124 includes digital to analog converter (DAC) 202, which provides a first and second analog input to modulation drive circuit 200. The outputs of modulation driving circuit 200, in turn, drive integrated optical chip 106.

As shown in FIG. 2, DAC 202 provides modulation drive circuit 200 with two separate inputs 220, 221, each a function of the optical intensity received at detector 118. DAC 202 functions either as a current-sourcing DAC or a current-sinking DAC. When DAC 202 is a current-sourcing DAC, DAC 202 pushes two currents on inputs 220, 221 into modulation drive circuit 200. The currents on inputs 220, 221 will be inverted from one another and shifted in offset from one another. Alternatively, when DAC 202 is a current sinking DAC, DAC 202 will pull currents on inputs 220, 221. The currents on inputs 220, 221 will also be inverted from one another and shifted in offset from one another.

Modulation drive circuit 200 comprises a balanced impedance network 204, a first differential amplifier 213 comprised of a first amplifier 206 and a first closed loop feedback 212, and a second differential amplifier 215 comprised of a second amplifier 208 and a second closed loop feedback 214. In one embodiment, modulation drive circuit 200 further comprises a servo amplifier 210. As modulation drive circuit 200 is driven by the input from DAC 202, first and second differential amplifiers 213, 215 within modulation drive circuit 200 functions as trans-impedance differential amplifiers.

Balanced impedance network 204 functions to distribute signals 220, 221 from DAC 202 to the first differential amplifier 213 and to the second differential amplifier 215 (shown as 220' and 221'). The balanced impedance network 204 functions to distribute input signals 220, 221 in a balanced manner, meaning that each of differential amplifiers 213, 215 receive substantially similar representations of both signals 220 and 221. Balanced impedance network 204 further distributes signals 220, 221 to first differential amplifier 213 with the opposite polarity as provided to second differential amplifier 215. For example, in one embodiment, balanced impedance network 204 distributes signals 220, 221 such that the first differential amplifier 213 receives 220' as an inverting input and 221' as a non-inverting input, while second differential amplifier 215 received 220' as a non-inverting input and 221' as an inverting input. As a result, the respective outputs from the first and second differential amplifiers 213, 215 provide two symmetrically inverted voltages for driving optical modulator 106, one for modulating the optical path in waveguide 110 and one for modulating the optical path in waveguide 112.

As would be appreciated by one of ordinary skill in the art upon studying this specification, differential amplifiers operate by producing an output signal having an amplitude proportional to the difference between the two inputs provided to the amplifier. By utilizing the dynamically changing signals 220' and 221' received from balanced impedance network 204 as inputs referenced against each other (rather than against a common static reference, such as a ground reference for example) each of the underlying component amplifiers (206, 208) will continue to operate over the most linear portion of their respective gain curves, thus providing optimal rise time performance, for a substantially greater range of input values as compared to prior designs. The rise time performance increase allows the modulation drive circuit 200 to operate over a narrow linear range. The time performance increase also allows the modulation drive circuit 200 to be implemented using low quality radiation hardened electrical components.

Modulation drive circuit 200 as illustrated in FIG. 2 further comprises optional servo amplifier 210. Servo amplifier 210 rejects the common mode of the outputs from first and second differential amplifiers 213, 215. Servo amplifier 210 monitors the respective outputs of first and second differential amplifiers 213, 215 (against a low noise ground reference) for any offset bias and provides a compensating reference signal 211 back to balanced impedance network 204. For the embodiment of FIG. 2, compensating reference signal 211 is used to adjust input signal 221' as received at first differential amplifier 213 and input signal 220' as received at second differential amplifier 215 so that the mean of the outputs of first and second differential amplifiers 213, 215 is zero volts. By rejecting the common mode of the outputs from first and second differential amplifiers 213, 215, servo amplifier 210 further compensates for parasitic noise that develops in FOG 100.

Figure 3:
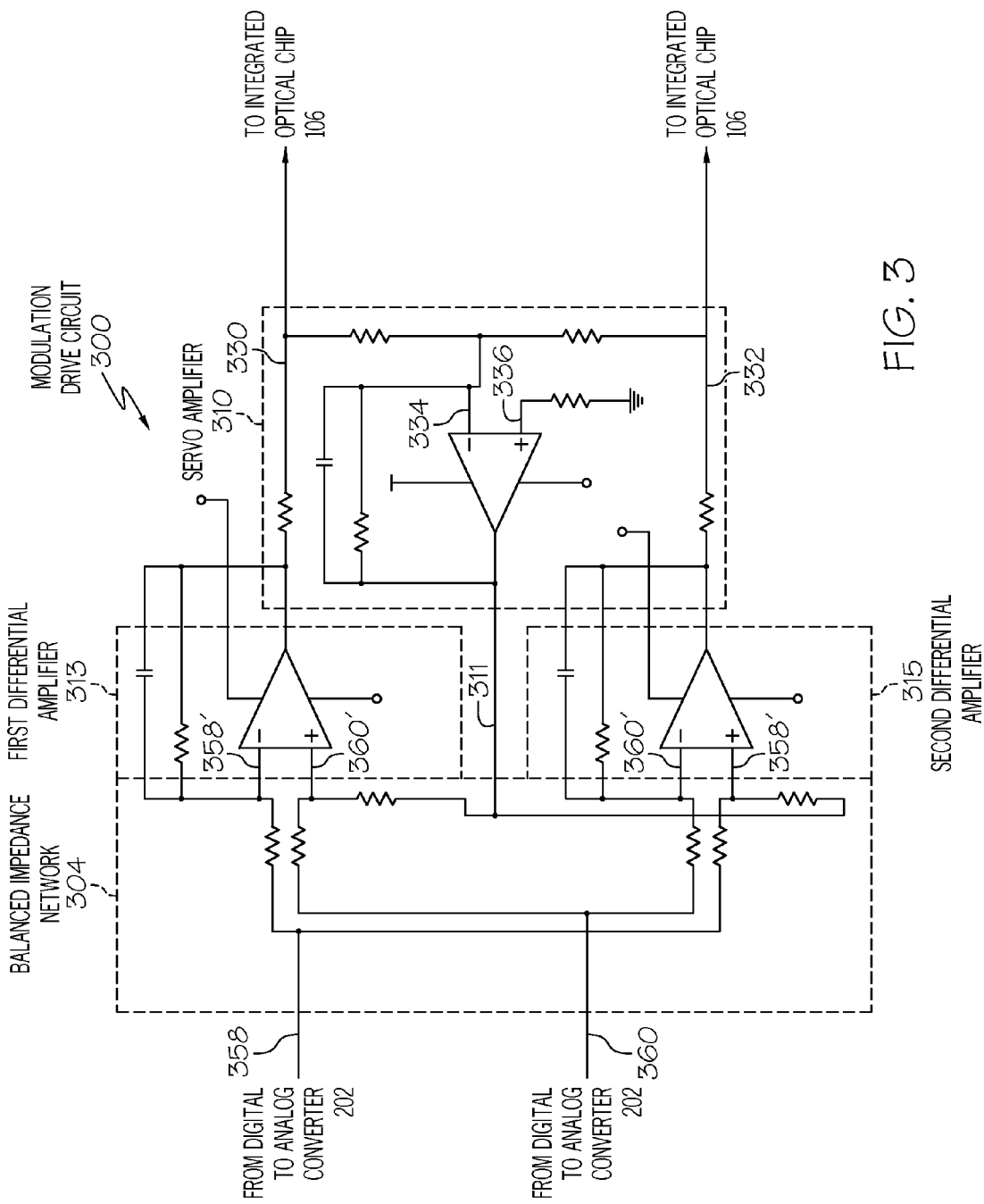
FIG. 3 is a schematic of an exemplary embodiment of a modulation driving circuit for a fiber optic gyroscope.

FIG. 3 illustrates another modulation drive circuit 300 of one embodiment of the present invention. In one embodiment, the design shown for modulation drive circuit 300 is used to realize modulation drive circuit 200 in FIG. 2. Modulation drive circuit 300 receives a first and second input 358, 360 from DAC 202. Modulation drive circuit 300 then amplifies first and second inputs 358, 360 to provide a first and second output 330, 332 to drive integrated optical chip 106.

Balanced impedance network 304 functions to distribute first and second inputs 358, 360 to a first and second differential amplifier 313, 315 and convert the received input current from DAC 202 into a voltage. In one embodiment, the design shown for balanced impedance network 304 is used to realize balanced distribution network 204 in FIG. 2. Balanced impedance network 304 includes impedances that modify first and second input signals 358, 360, which are currents, such that first and second differential amplifiers 313, 315 receive voltage inputs that are inverted combinations of amplifier input signals 358', 360'. For example, balanced impedance network 304 includes a series of resistors and connections that function to provide amplifier input signal 358' to the inverting input on first differential amplifier 313 and to the non-inverting input on second differential amplifier 315 and provide amplifier input signal 360' to the non-inverting input on first differential amplifier 313 and to the inverting input on second differential amplifier 315. First and second differential amplifiers 313, 315 will amplify the difference between the inputs. By providing inverted combinations of the amplifier input signals to first and second differential amplifiers 313, 315, balanced impedance network 304 will cause the first and second differential amplifiers 313, 315 to amplify the signals within their linear region. For example, when DAC 202 pushes a first current on input 358 and a second current on input 360, first differential amplifier 313 will amplify the difference between the resulting voltage signal 358' subtracted from the resulting voltage signal 360'. Meanwhile, second differential amplifier 315 will amplify the difference between the resulting voltage signal 360' subtracted from the voltage signal 358'.

The input series impedances of balanced impedance network 304 are set low in contrast to a set of ideal difference amplifiers. In one embodiment, the input series impedances of balanced impedance network 304 are set to be four times the matched output impedance of the outputs of DAC 202. Minimizing and matching the input impedances of balanced impedance network 304 to the outputs of DAC 202 allows the modulation drive circuit 300 to improve slew rate and distortion without strict, symmetrical, low impedance matching throughout. Further, minimizing and matching the input impedances of balanced impedance network 304 to the outputs of DAC 202 allows modulation drive circuit 300 to achieve maximum coupling between first and second inputs 358 and 360 and first and second outputs 330 and 332. The controlled implementation of modulation drive circuit 300 uses the power of the first and second differential amplifiers 313 and 315 to accelerate rise times by carefully increasing the input each differential amplifier receives.

After receiving amplifier input signals 358', 360', modulation drive circuit 300 transmits first and second outputs 330, 332 to drive electrodes 114 in FIG. 1. In one embodiment, the first and second outputs are combined into an input for servo amplifier 310. Servo amplifier 310 functions to combine first and second outputs 330, 332 and reject the common mode of first and second outputs 330, 332. By rejecting the common mode, servo amplifier 310 references outputs 330, 332 against a common reference (ground) and removes any system parasitics that have developed in the signal during the operation of FOG 100. To reject the common mode and remove parasitic noise that develops in operation of FOG 100, servo amplifier 310 functions as a summing amplifier of outputs 330, 332. The outputs 330, 332 are combined into the inverting input of servo amplifier 310 and referenced against ground. Further, servo amplifier 310 transmits a common mode adjustment signal 311 to the balanced impedance network 304 for distribution to the first and second differential amplifiers 313, 315. The common mode adjustment signal biases the outputs 330, 332 such that the sum of the outputs 330, 332 moves toward the common reference. The outputs of the modulation drive circuit are then transmitted to the integrated optical chip 106.

The modulation drive circuit 300 functions to amplify two inputs 358, 360 received from DAC 202, amplify the inputs 358', 360' within the linear region of two trans-impedance differential amplifiers 313, 315, reject the common mode of the amplified signals and remove system parasitics through the implementation of a servo amplifier 310, and drive electrodes 114 in a integrated optical chip 106.

This description is presented for purposes of illustration, and is not intended to be exhaustive or limited to the embodiments disclosed. Variations and modifications may occur, which fall within the scope of the following claims. For example, the embodiments above relate to a FOG, but it is understood that any variation or species of a FOG can utilize the described invention. Furthermore, some of the components described below may be implemented using either digital or analog circuitry, or a combination of both.

What is claimed is:

1. A modulation drive circuit, the circuit comprising:
    a balanced impedance network having a first output and a second output generated from a first input, and a third output and a fourth output generated from a second input, wherein the first output and the second output are balanced with respect to each other, and the third output and the fourth output are balanced with respect to each other;
    a first differential amplifier, wherein an inverting input of the first differential amplifier is coupled to the first output of the balanced impedance network and a non-inverting input of the first differential amplifier is coupled to the third output of the balanced impedance network; and
    a second differential amplifier, wherein an inverting input of the second differential amplifier is coupled to the fourth output of the balanced impedance network and a non-inverting input of the second differential amplifier is coupled to the second output of the balanced impedance network.

2. The modulation drive circuit of claim 1, wherein:
    the first differential amplifier comprises a first operational amplifier having a first feedback loop coupling an output of the first operational amplifier to the non-inverting input of the first differential amplifier; and
    the second differential amplifier comprises a second operational amplifier having a second feedback loop coupling an output of the second operational amplifier to the non-inverting input of the second differential amplifier.

3. The modulation drive circuit of claim 1, further comprising at least one digital to analog converter separately driving the first input and second input of the balanced impedance network, wherein the second input is an inverted version of the first input.

4. The modulation drive circuit of claim 3, wherein the second input is an inverse version of the first input offset by a bias.

5. The modulation drive circuit of claim 1, further comprising a servo amplifier, wherein the servo amplifier adjusts a common mode of an output of the first differential amplifier and an output of the second differential amplifier.

6. The modulation drive circuit of claim 5, wherein the servo amplifier generates a common mode feedback to the balanced impedance network generated from a sum of the output of the first differential amplifier with the output of the second differential amplifier, said sum referenced against a reference.

7. The modulation drive circuit of claim 6, wherein the reference is a ground potential and the servo amplifier adjusts the common mode of the output of the first differential amplifier and the output of the second differential amplifier such that the servo amplifier removes phase and gain differences between the output of the first differential amplifier and the output of the second differential amplifier.

8. The modulation drive circuit of claim 1, wherein an output of the first differential amplifier drives a modulating voltage across a first set of electrodes for a first optical path of an integrated optical circuit; and
    wherein an output of the second differential amplifier drives a modulating voltage across a second set of electrodes for a second optical path of the integrated optical circuit.

9. The modulation drive circuit of claim 1, wherein the balanced impedance network, the first differential amplifier, and the second differential amplifier are radiation hardened.

10. A modulation drive circuit for a fiber optic gyroscope, the circuit comprising:
    a balancing network configured to receive a first analog input signal and a second analog input signal, the first analog input signal and the second analog input signal each generated from an optical intensity measurement of an optical waveform;
    a first differential amplifier coupled to the balancing network, the first differential amplifier producing a first optical phase modulation adjustment signal based on a difference of the first analog input signal subtracted from the second analog input signal;
    a second differential amplifier coupled to the balancing network, the second differential amplifier producing a second optical phase modulation adjustment signal based on a difference of the second analog input signal subtracted from the first analog input signal;
    a servo amplifier coupled to the first differential amplifier and the second differential amplifier, wherein the servo amplifier provides a common mode adjustment of the first optical phase modulation adjustment signal and the second optical phase modulation adjustment signal;
    wherein the first differential amplifier adjusts an offset of the first optical phase modulation adjustment signal based on the common mode adjustment; and
    wherein the second differential amplifier adjusts an offset of the second optical phase modulation adjustment signal based on the common mode adjustment.

11. The circuit of claim 10, wherein the common mode adjustment comprises a summed voltage of the first optical phase modulation adjustment signal with the second optical phase modulation adjustment signal compared against a reference.

12. The circuit of claim 11, wherein the reference is a ground potential and the servo amplifier adjusts the common mode adjustment remove phase and gain differences between the first optical phase modulation adjustment signal and the second optical phase modulation adjustment signal.

13. The circuit of claim 10, further comprising at least one digital to analog converter providing a current as the first analog input signal and the second analog input signal to the balancing network, wherein the second analog input signal is an inverted version of the first analog input signal, wherein the currents of both the first and second analog input signals are shifted such that both currents are positive or both currents are negative.

14. The circuit of claim 10, wherein the second analog input signal is an inverse version of the first analog input signal offset by a bias.

15. The circuit of claim 10, wherein the balancing network, the first differential amplifier, the second differential amplifier, and the servo amplifier are radiation hardened.

16. The circuit of claim 10, wherein the first optical phase modulation adjustment signal drives a modulating voltage across a first set of electrodes for a first optical path of an integrated optical circuit; and
wherein the second optical phase modulation adjustment signal drives a modulating voltage across a second set of electrodes for a second optical path of the integrated optical circuit.

17. A fiber optic gyroscope comprising:
an integrated optical chip configured to phase modulate light signals that traverse through a fiber optic coil coupled to the integrated optical chip;
a detector coupled to the integrated optical chip and configured to produce an electrical signal from the light signals;
a loop closure electronic system configured to receive the electrical signal from the detector and provide a first optical phase modulation adjustment signal and a second optical phase modulation adjustment signal to the integrated optical chip, the loop closure electronic system comprising a modulation drive circuit, wherein the modulation drive circuit comprises:
a balancing network configured to receive a first input signal and a second input signal, the first analog input signal and the second analog input signal each generated from the electrical signal received from the detector;
a first differential amplifier coupled to the balancing network, the first differential amplifier producing a first optical phase modulation adjustment signal based on a difference of the first analog input signal subtracted from the second analog input signal; and
a second differential amplifier coupled to the balancing network, the second differential amplifier producing a second optical phase modulation adjustment signal based on a difference of the second analog input signal subtracted from the first analog input signal;
wherein the first optical phase modulation adjustment signal drives a modulating voltage across a first set of electrodes for a first optical path in the integrated optical circuit; and
wherein the second optical phase modulation adjustment signal drives a modulating voltage across a second set of electrodes for a second optical path of the integrated optical circuit.

18. The fiber optic gyroscope of claim 17, further comprising:
a servo amplifier coupled to the first differential amplifier and the second differential amplifier, wherein the servo amplifier provides a common mode adjustment of the first optical phase modulation adjustment signal and the second optical phase modulation adjustment signal;
wherein the first differential amplifier adjusts an offset of the first optical phase modulation adjustment signal based on the common mode adjustment; and
wherein the second differential amplifier adjusts an offset of the second optical phase modulation adjustment signal based on the common mode adjustment.

19. The fiber optic gyroscope of claim 17, wherein the common mode adjustment comprises a summed voltage of the first optical phase modulation adjustment signal with the second optical phase modulation adjustment signal compared against a reference.

20. The fiber optic gyroscope of claim 17, wherein the integrated optical chip, the detector, and the loop closure electronic system are constructed of radiation hardened electronic components.

* * * * *